H. F. MAYNES.
MECHANICAL INSCRIPTION CAMERA.
APPLICATION FILED OCT. 25, 1917.

1,274,179.

Patented July 30, 1918.
5 SHEETS—SHEET 1.

H. F. MAYNES.
MECHANICAL INSCRIPTION CAMERA.
APPLICATION FILED OCT. 25, 1917.

1,274,179.

Patented July 30, 1918.
5 SHEETS—SHEET 2.

H. F. MAYNES.
MECHANICAL INSCRIPTION CAMERA.
APPLICATION FILED OCT. 25, 1917.

1,274,179.

Patented July 30, 1918.
5 SHEETS—SHEET 3.

Inventor
H. F. Maynes
By his Attorneys
Pennie, Davis, Marvin & Edmonds

H. F. MAYNES.
MECHANICAL INSCRIPTION CAMERA.
APPLICATION FILED OCT. 25, 1917.

1,274,179.

Patented July 30, 1918.
5 SHEETS—SHEET 5.

UNITED STATES PATENT OFFICE.

HYLA F. MAYNES, OF GAINES, PENNSYLVANIA.

MECHANICAL-INSCRIPTION CAMERA.

1,274,179.  Specification of Letters Patent.  Patented July 30, 1918.

Application filed October 25, 1917. Serial No. 198,376.

*To all whom it may concern:*

Be it known that I, HYLA F. MAYNES, a citizen of the United States, residing at Gaines, in the county of Tioga, State of Pennsylvania, have invented certain new and useful Improvements in Mechanical-Inscription Cameras; and I do hereby declare the following to be a full, clear, and exact description of the invention, such as will enable others skilled in the art to which it appertains to make and use the same.

The present invention relates to a photographic camera having a mechanical inscription device for marking the film, such as shown in my prior application, Serial Number 164,715, filed April 26, 1917.

In the said application, the camera is of the type adapted to hold a roll of film and provided with a removable back. There is mounted upon this back a mechanism by means of which the photographic film may be perforated or impressed with any desired characters to serve as identification marks for subsequent reference after the film has been developed. In order that successive characters may be applied to the film with uniform spacing, means are also provided for indicating when successive portions of the film are in the proper position to be perforated.

In using a camera one is often obliged to take exposures in rapid succession with no opportunity to apply any identification marks to the film between each exposure. The usefulness of a camera of the general type referred to above will be greatly increased if it is arranged so that designation marks may be applied to a film after the latter has been removed, developed and cut up into sections each containing a picture. The so-called autographic cameras now in use do not possess this advantage since the identification marks must be photographed upon the film before it is developed, and if there is no time between successive exposures to apply these marks, they cannot subsequently be applied to the film after it has been removed and developed. While the perforating mechanism shown in my prior application referred to above is mounted upon the removable back of the camera and so may be used for perforating films or other materials when the back is removed so that the film or other material may be placed in operative relation to the perforating devices, no provision has been made for mechanically feeding the film into position to be perforated nor for indicating when the film has been moved the correct amount between successive applications of the identification characters.

It is the primary object of the present invention to provide in a camera of the general type shown in my prior application and in operative relation with the perforating mechanism of such a camera, apparatus whereby separate pieces of developed film or other material may be held in place and moved in relation to the perforating mechanism so that successive characters may be applied thereto, it being understood that the back of the camera is removed to permit such use of the mechanism mounted thereon. It is a further object to provide in conjunction with such film feeding mechanism means for setting the pieces of film or other material in such a relation to the perforating apparatus that the inscription applied to the film or other material will be symmetrically disposed thereon so that when prints are subsequently made from the film, the legend designating the subject of the picture will appear in a symmetrical and selected position thereon.

In accordance with the present invention, the mechanism comprises gripping members slidably mounted upon the back of the camera in such a manner that when the back is in place and the perforating mechanism is being used for perforating successive sections of the film as it is drawn through the camera after each exposure, the gripping members may be pushed to one side out of position. When, however, the back of the camera is removed for the purpose of using the mechanism of the present invention to mark separate pieces of film, this mechanism may be placed into operating relation with the devices that are used for operating the perforating apparatus so that a single operation of these devices performs the function of feeding the film or other material by a step by step movement and also performs the function of operating the perforating devices to apply the desired characters in a symmetrical and selected position on the film or other material.

Another object of the present invention is to provide in connection with the perforating devices improved mechanism for operating them and for positively restoring these devices to their normal position after each operation, this mechanism being of somewhat different form than that shown in my prior application referred to above.

Other objects and features of advantage of the present invention will appear more clearly from a description of a preferred embodiment thereof as shown in the accompanying drawings, in which Fig. 3 is an elevation of the back of the camera showing also the location of the section lines along which Figs. 1 and 2 are taken; Fig. 12 is a detail view in section along the line 12—12 of Fig. 10.

Referring to the drawings in which similar reference characters denote similar parts throughout the several views, 20 represents the body portion of the casing of a camera of the folding type. This casing has roll holding chambers 21 and 22 containing spools 23 and 24 respectively; 23 being the spool upon which the exposed film is to be wound while 24 is a spool for holding the unexposed film. The film itself is shown at 25 passing over rollers 26 and 27 located adjacent the removable back 28. A portion of the usual folding bellows of the camera is shown at 29 attached to the frame 30 which lies between the roll holding chambers and defines the exposure opening in accordance with the usual construction of cameras of this type. Since the lens, shutter and other devices located at the forward end of the bellows form no part of the present invention, they have been omitted for the sake of simplicity.

Figure 1:
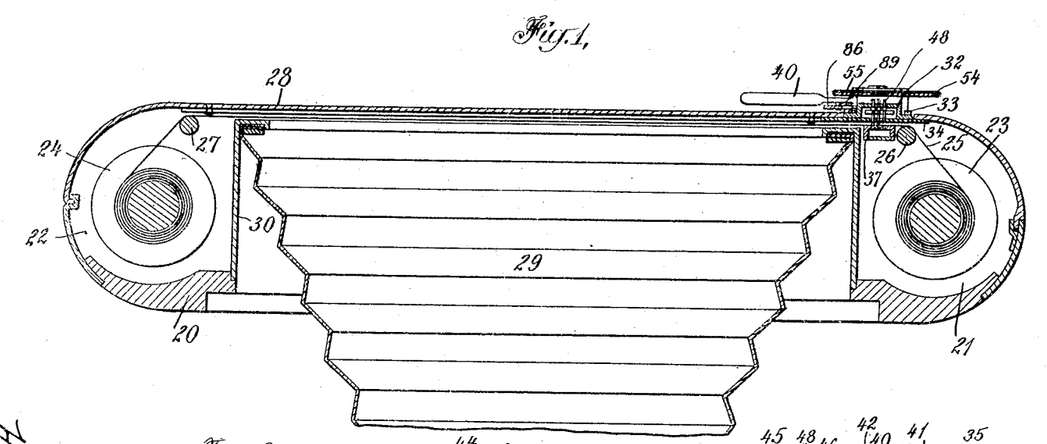
Figure 1 represents a longitudinal section through the film-holding portion of a camera, and remaining portions being omitted since they may be of any well known construction.
Figure 2:
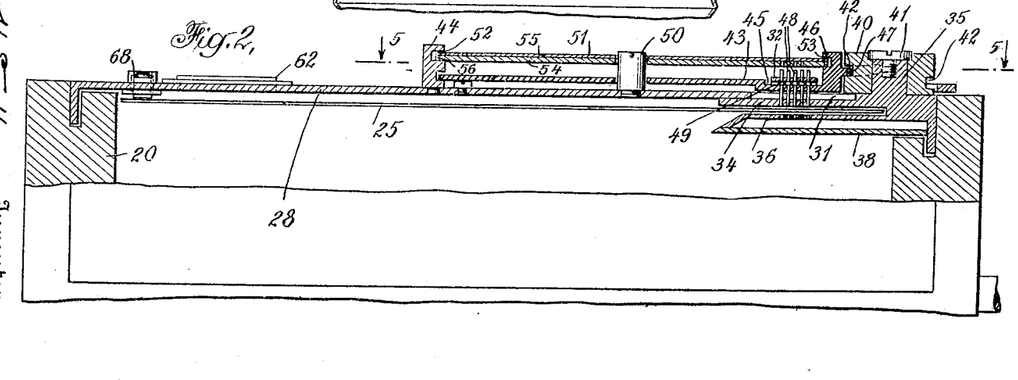
Fig. 2 is a section through the back of the camera in a direction transverse to that of Fig. 1 and on a larger scale.
Figure 6:
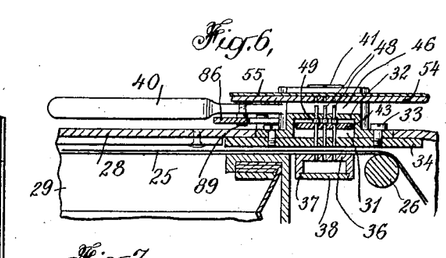
Fig. 6 is a sectional view along the line 6—6 of Fig. 5.

Upon the removable back of the camera and near the end thereof which forms the chamber for holding the roller upon which the exposed film is wound is mounted the perforating apparatus of the present invention. The back is provided with an aperture as indicated at 31 within which is mounted a housing 32 attached by screws 33 to a supporting member 34 which is fastened to the back of the camera in any convenient manner. The member 34 has an extended portion 35 forming a hub as shown most clearly in Fig. 2. The supporting member is also provided with an anvil portion 36 parallel to, but spaced apart from the flat portion of the member. The anvil portion is provided with inwardly extending side and end portions, the former being provided with beveled grooves as indicated at 37 in Fig. 6. A cover plate 38 is fitted within these grooves to form with the sides and end of the anvil portion a receptacle adapted to receive the excised portions of the film.

Upon the hub portion 35 is mounted a lever 40 which is retained in place by a set screw 41. The portion of the lever surrounding the hub is substantially cylindrical in form and is provided over the greater portion of its face with a spiral groove as indicated at 42. An operating member 43 is mounted upon the outside of the camera back as shown most clearly in Figs. 2 and 5. This member is held in place at its outer end by a guard 44 provided with a notch within which the end of the member is placed. The other end of the operating member 43 is formed with an inwardly extended portion 45 adapted to fit within the aperture 31 provided in the back of the camera and an outwardly extended portion 46 provided with a tongue 47 fitting within the groove 42 on the cylindrical portion of the operating lever 40. The portion 45 of the operating member 43 is provided with a number of apertures and in these apertures perforating pins or punches 48 are mounted. These punches extend into corresponding apertures in the flat portion of the supporting member 34 but should not extend beyond the inner face of the latter portion when the operating member is in normal position as indicated most clearly in Fig. 2. Each of the punches extends upwardly through apertures in the housing 32 and is provided with a shoulder 49 lying between the housing and the operating member 43.

Figure 7:
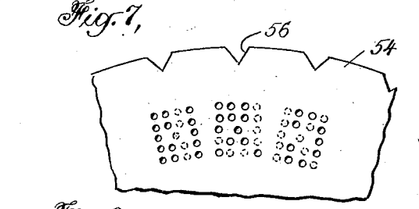
Fig. 7 is a detail view of a portion of the index plate.
Figure 8:
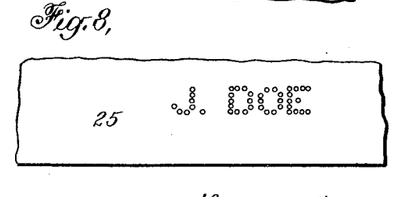
Fig. 8 is a detail view showing a portion of a photographic film with characters perforated therein.

A hub 50 is mounted upon the camera back and extends through an aperture in the operating member 43. This hub serves as the pivot for an index plate 51 by which the selective operation of the punches is performed. While the index plate is adapted to be turned about the hub 50 as an axis, provision is made for a certain amount of play between the hub and the plate. The index plate is held in position at diametrically opposite points by being fitted within a notch 52 in the guard 44 and a similar notch 53 in the outwardly extended portion 46 of the operating member 43. The index plate is preferably made up of two portions, an inner plate 54 and an outer plate 55. The inner plate is provided near its periphery with groups of apertures which are differently arranged in each group as indicated most clearly in Fig. 7 in which the full lines represent the apertures. The apertures are so related to the outer ends of the punches that when the index plate is depressed, the apertures will pass over the outer ends of certain of the punches whereby these punches will not be operated, while the portions of the index plate which are not provided with apertures will engage the ends of certain of the punches to form the desired characters as indicated by the broken circles in Fig. 7. The outer plate 55 is provided near its periphery with characters corresponding to the characters which will be produced by the solid portions of the inner plate. The edges of both inner and outer plates are provided with notches 56 opposite each of the characters. For holding the index plate in any desired position a pawl or pin 57 is provided (see Fig. 5). This pawl is slidably mounted in a guide 58, and spring 59 connected to an extension of the pawl holds the latter normally in one of the notches of the index plate.

Figure 9:
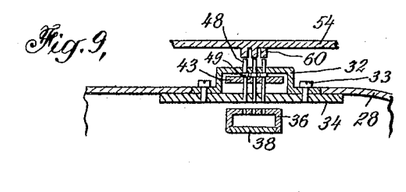
Fig. 9 is a detail view showing a modified form of index plate.

The retaining pawl 57 may serve also as an index pointer, in which case the characters on the outer plate 55 will be so related to the grouped apertures on the inner plate 54 that when a given character is brought opposite the pawl the group of perforations arranged to produce that character will lie above the perforating pins. An index line may, however, be provided at any other convenient place, as on the top face of the part 46 or the top face of the part 44, and in either case the characters on the plate 55 will be correspondingly related to the grouped apertures in the plate 54. Instead of providing the inner plate 54 with apertures into which certain of the punches may pass, it may be provided with projections, either in the form of individual pins or of unbroken character, corresponding to the outline of the character to be produced by the punches, as indicated in cross section at 60 on Fig. 9.

In operating this perforating mechanism after the film is brought into position to have the first character perforated therein, the index plate 51 is rotated to bring the desired character opposite the holding pawl 57, or other index line, it being understood that when the index plate is thus set, the corresponding character on the inner plate 54 will be in position over the ends of the pins or punches. During the operations above described, the lever 40 should occupy its normal position as shown in full lines in each of the figures in which it appears. To effect the perforating operation, the lever is swung through 180° to the position shown at C in Fig. 5. During the first quarter turn of the lever, the spiral groove 42 in the cylindrical portion therein will, through the tongue 47 on the end of operating member 43 force this member inwardly out of engagement with the shoulders 49 on the punches. None of the punches will, however, be actuated during this movement of the lever, since the index plate 51 is not sufficiently depressed. During the second quarter turn of the lever, the operating member 43 will be still further depressed and the index plate will pass over the ends of certain of the pins but others corresponding to the character which it is desired to perforate into the film will be depressed. The punches will pass through the film and into the apertures provided in the anvil portion 36 carrying with them the excised portions of the film which will fall into the receptacle beneath the anvil.

The punches will remain in depressed position until the lever is restored to its normal position. During this reverse swing of the lever, the operating member 43 will be restored to its normal position and will carry with it all of the pins that have been depressed. The hub 50 should pass loosely through both the operating member 43 and the index plate 51 so as to permit both of these members to be tipped slightly without binding during the perforating operation.

Figures 10, 11, 13, 14:
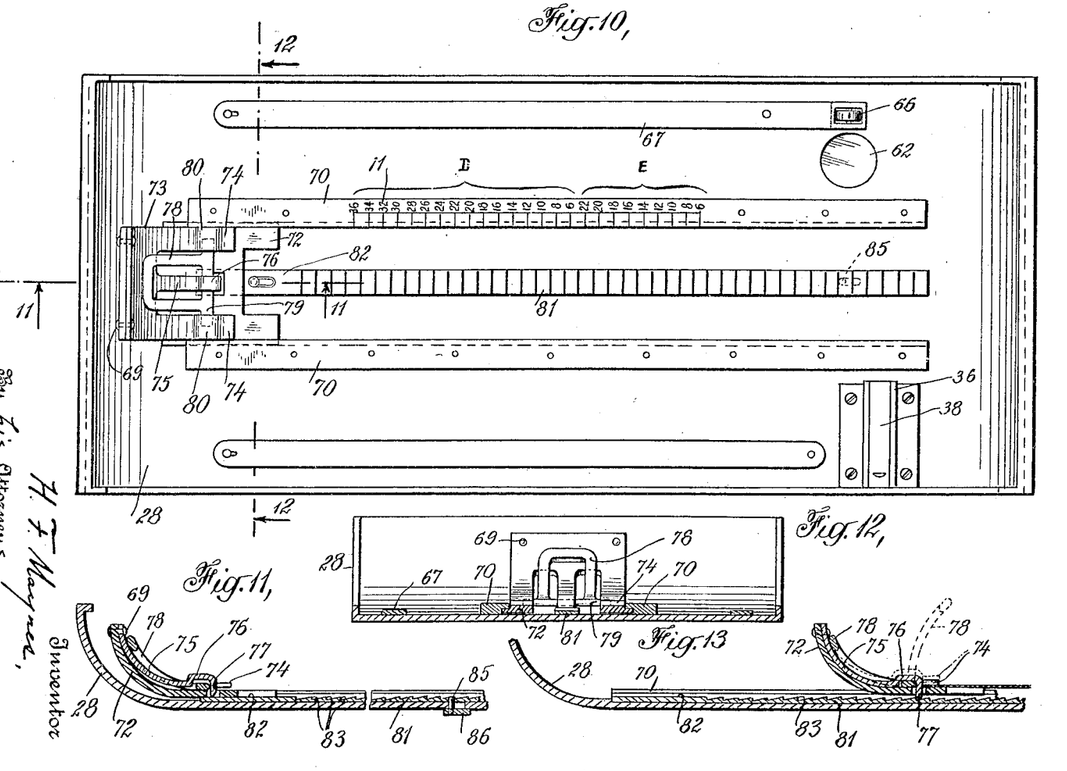
Fig. 10 is an elevation of the inside of the camera back showing some of the mechanism mounted thereon.
Fig. 11 is a detail view in section along the line 11—11 of Fig. 10.
Fig. 13 is a view of the devices of Fig. 11 in a different position.
Fig. 14 is a view similar to Fig. 10, but showing a piece of film or other material in position to be operated upon.

In accordance with the present invention, I associate with the film-perforating mechanism thus mounted on the back of the camera, novel apparatus for gripping a separate piece of film or other material and moving it with respect to the perforating mechanism to facilitate the symmetrical marking of the piece of film or other material at a selected portion thereof. For this purpose a pair of guideways 70 (see Figs. 10 to 14, inclusive) is attached to the inner face of the back of the camera and one of them is preferably provided with index marks 71 and numerals, the index marks being spaced apart distances corresponding to those which should occur between successive perforations of the film. A base or support member 72 is slidably mounted between the guideways 70. As shown most clearly in Figs. 11 and 13, this base member is curved to correspond substantially to the curved portion of the back of the camera. A resilient gripping member 73, Fig. 10, having a curvature substantially the same as that of the base member is attached to the free edge of the latter by rivets 69. As shown most clearly in Figs. 10 and 12, the gripping member is formed with three resilient tongue portions, the side ones 74 extending parallel to the flat portion of the base member and adapted to form in conjunction with the latter a grip for holding the edge of film or other material that is to be operated upon. The free end of the middle tongue 75 is bent upwardly as at 76 and then downwardly as at 77 where it extends through an aperture in the base member and is formed as a pawl. A lifting lever 78 of the form shown most clearly in Figs. 10 and 12 is provided with extensions 79 adapted to fit under raised portions 80 of the side tongues 74. These extensions as well as the part of the lever which passes under the raised portion 76 of the middle tongue 75 are flat, so that when the lever is in its depressed position, as shown in Fig. 13, the gripping tongues 74 will be held against the base member by their resiliency to grip the edge of film or other material between these tongues and the base member 72, but if the lever 78 is moved into the dotted line position as indicated in this figure the extensions 79 thereof will cause the free ends of the tongues to be lifted into the position shown in dotted lines in this figure so that film or other material may be inserted or withdrawn.

Figure 5:
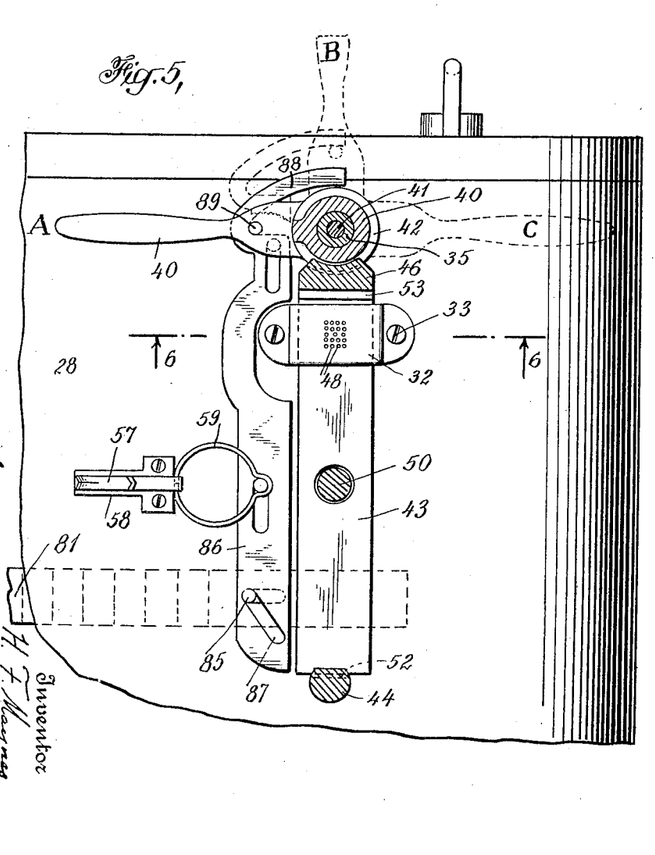
Fig. 5 is an elevation on a larger scale of a portion of the back of a camera with certain parts removed to show the mechanism more clearly.

For moving the gripping mechanism with respect to perforating mechanism, there is provided a rack bar 81 which is set into the back of the camera in such a manner as to have a limited longitudinal movement. As shown at the left hand of Fig. 10, this rack bar is provided with a flat face as at 82, but over the remaining portion of its length, it is provided with ratchet teeth 83 spaced apart a distance corresponding to the forward movement which should be imported to the film or other material for producing successive evenly spaced perforations therein. A pin 85 is attached to the back of the rack bar and extends through a slot in the back of the camera, and through a diagonal slot 87 formed in a link 86 which is slidably mounted upon the outside of the camera back and is operatively connected to the lever 40 (Fig. 5). The link 86 is guided in its movement by the pin and slot arrangement illustrated and the end of the link adjacent the lever 40 is provided with a curved extension 88 and a pin 89 projects from the inner face of the lever 40 in position to engage the inner face of the curved extension so that when the lever is swung from the position shown at A in Fig. 5 through 90° to the position indicated at B, the link 86 will be moved into the dotted line position and will through the pin and slot connection with the rack bar produce reciprocating movement of the latter.

It will be noted that the index marks 71 on one of the guideways 70 are arranged in two series or scales D, E. The former series is for use with what is known as a horizontal picture, while the latter series is for use with a vertical picture. As shown in Fig. 10, successive index marks of each series are designated by alternate numbers, in the present case even numbers beginning with 6. The zero point of each of these scales should be so related to the anvil 36 that if one edge of a film or other piece of material is placed at the zero point, the anvil and perforating punches will occupy a position substantially midway between the edges of the film. The arrangement thus described enables one to apply the desired inscription symmetrically between the ends of the film for by noting beforehand the total number of characters and spaces which make up the complete inscription and then starting the perforating operation at the line designated by this number, it will be seen that when the entire inscription has been applied to the film, it will be substantially symmetrically disposed on either side of the center of that portion of the film where the inscription is placed. In case the total number of characters and spaces between them is an odd number, the edge of the film should preferably be set opposite the even number above the odd number, since there is always one movement of the film preceding the first perforation. In either case the resultant inscription will be but slightly displaced from its position of symmetry with respect to the edge of the film. For convenience in adapting the apparatus for either horizontal or vertical pictures, separate scales should be provided as explained above. They may be provided on the same guide bar as shown or one may be inscribed in each of the guide-bars.

In case it is desired to use the apparatus of the present invention for applying characters to a piece of film that has been developed or to any other material, the back of the camera is removed. Assuming that the piece of film contains what is known as a horizontal picture in which case the designation characters should be applied along the longer side of the film, the piece of film will be placed in position shown in full lines in Fig. 14 so that the longer edge will pass between the anvil member 36 and the perforating pins. Before the perforating operation is started the lever 78 of the gripping mechanism will be lifted into the dotted line position shown in Fig. 13 to lift the gripping member 74 above the base member 72 and also to raise the pawl 77. The edge of the piece of film will then be adjusted in place beneath the free edge of the gripping member and the latter with the base member will be moved along the guideways until the edge of the film is next to the number corresponding to the total number of characters and spaces making up the inscription. The lever 78 is then folded down into the position shown in full lines in Fig. 13 which action causes the gripping member to engage the edge of the film and at the same time lowers the pawl 77 into engagement with the rack bar 81.

Figures 14, 15, 16:
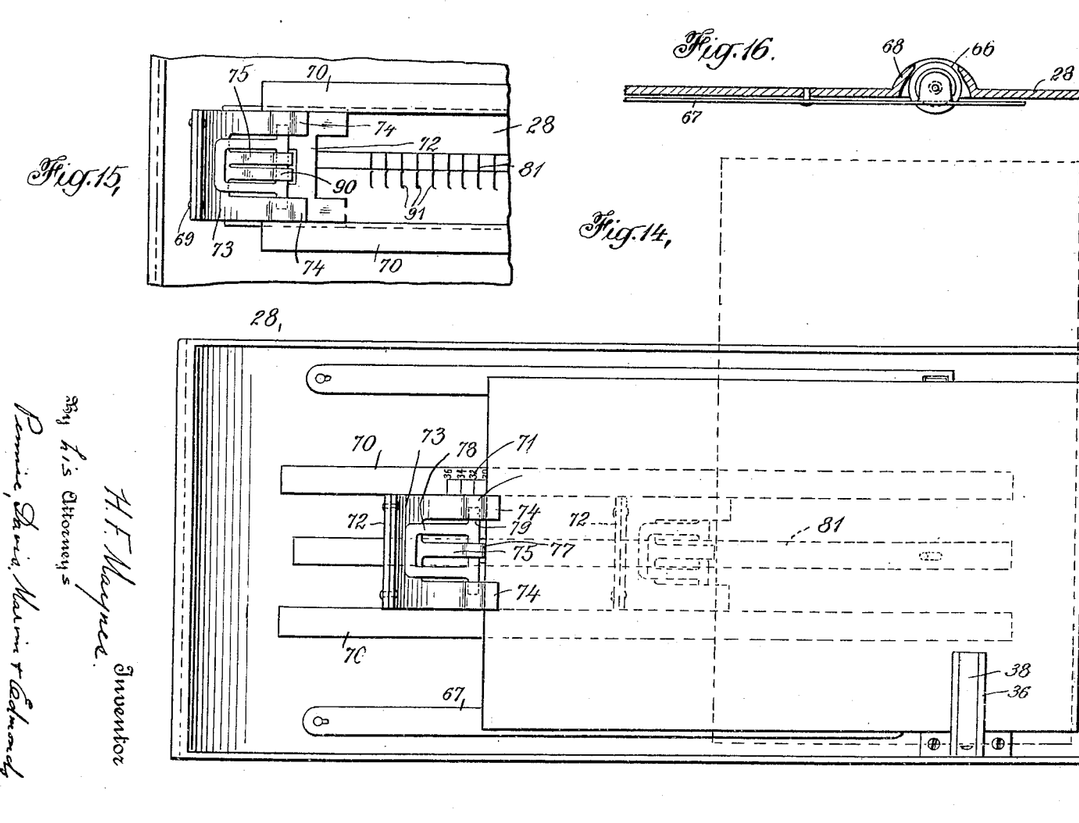
Fig. 15 is a detail view of a modified arrangement of the mechanism shown in Figs. 10 to 14 inclusive.
Fig. 16 is a view of the index roller.

When the film is thus in position to be perforated the lever 40 is swung to effect the perforating operation, it being understood that the desired character has previously been set up by manipulation of the index plate 51. Since the first quarter turn of the lever will cause movement of the rack bar through the link 86 and the pin and slot connection between this link and the rack bar, the film will be moved one space before the perforating operation is performed. The second quarter turn of the lever 40 will cause the desired perforating pins to apply the proper character to the film. The lever 40 must then be swung to its normal position to restore the depressed punches to their normal positions and the return movement of the lever will through the link 86 cause the rack bar 81 to be moved in the opposite direction. To avoid carrying the gripping members and hence the film backward, the base member 72 should fit somewhat snugly under the guideways 70, but in order to more positively insure that the gripping member shall not be moved backwardly, the arrangement shown in Fig. 15 may be used. In this figure, the base member 72 is of substantially the same construction as described hereinbefore, but the gripping member 73 is provided with an extra tongue 90 which has a downwardly turned free end adapted to engage teeth 91 formed on the back of the camera, these teeth being so arranged that the free end of the tongue 90 slides over them as the gripping mechanism is being advanced by the rack bar 81, but will catch in them and prevent motion of the gripping mechanism in the opposite direction as the rack bar is reciprocated prior to the next advance of the gripping mechanism.

After the first character has been applied to the film, the next character is set up on the index plate and the lever 40 is swung to cause the rack bar 81 to be moved and to carry the gripping mechanism forward another step to bring a succeeding portion of the film into position to be perforated. This action will occur during the first quarter turn of the lever and the perforating operation will take place during the second quarter turn as has been described. In this manner any number of characters may be applied to the film.

In case the picture on the film is what is known as a vertical one in which case the designation mark should preferably be applied along the shorter edge of the film, the latter will be placed in the position shown in broken lines in Fig. 14 and the gripping mechanism will then occupy the position shown in broken lines in this figure. In this case the film may be given a step by step feed and characters may be perforated therein in the manner described above. In either case, whenever it is desired to form a space between words, the lever 40 is simply given a quarter turn into the position B and then restored to normal position before printing the first character of the next word. This action will advance the film one space but no character will be applied thereto.

Figure 3:
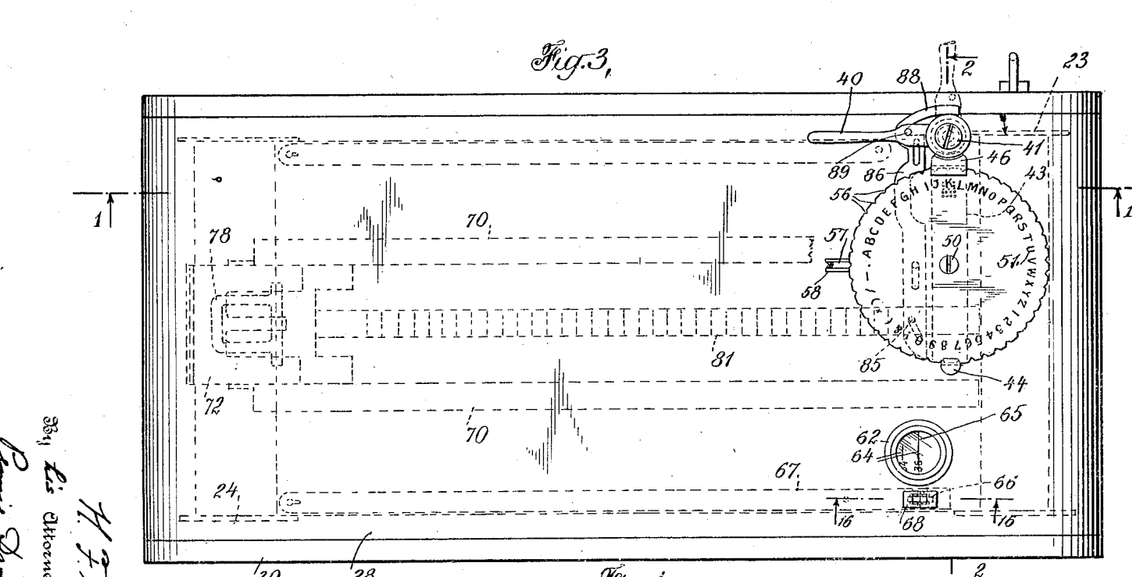

When the camera back is to be placed on the camera for the usual purpose, the gripping mechanism is slid to one side as indicated in Figs. 3, 10 and 11, where it is out of the way. The ordinary roll film may then be placed in the camera in the usual way and passed from the holding roll over the guide rollers and on to the receiving roll, care being taken to slip the edge of the film in place between the anvil portion 36 and the ends of the punches before the back is finally brought into the closing position. The perforating mechanism may then be employed to mark the roll of film in the manner described in my foregoing application and as will be understood from the above description. In the said application I disclosed mechanism for indicating the extent of movement necessary to properly space the perforation characters on the film, which mechanism is preferably employed in addition to the mechanism above described, so that the perforating mechanism may be used with rolls of film having the ordinary backing strips without the special marking shown in Fig. 4. As shown here, this mechanism is a slight modification of that shown in the prior application and consists of a roller 66 mounted upon the end of a strip 67 attached to the back of the camera. The roller fits within a chamber formed by a raised portion 68 of the camera back. This raised portion is provided with an aperture and the roller is formed with a central portion of substantially the width of the aperture, this portion preferably being provided with a white surface upon which are drawn index lines spaced apart a distance corresponding to that through which the film must be drawn for successive perforations. A transverse index line should be placed on the top of the raised portion 68 to serve as a guide for setting the index marks on the roller, and the shape of the roller and the construction of the raised portion 68 are such as to prevent objectionable entrance of light.

Figure 4:
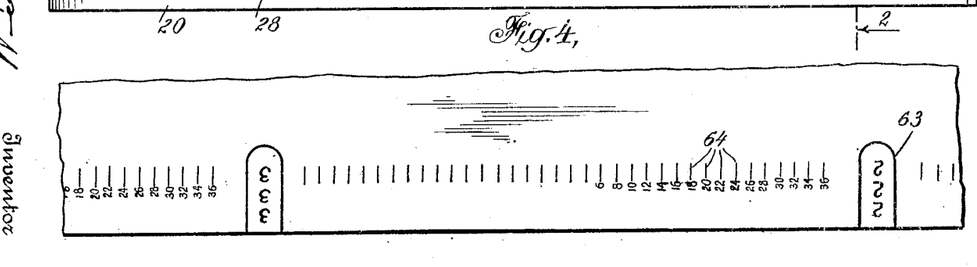
Fig. 4 is a view of a portion of the film backing.

I prefer, however, where it is possible to do so to make use of a roll of film having a backing provided with index markings of the character hereinbefore described as applied to the guide 70, and I have illustrated such a backing in Fig. 4 from which it will be seen that I place upon the backing, in position to be visible through the usual sight opening 62, covered with a ruby glass or celluloid, a series of equally spaced marks 64 which may be brought successively into registry with a cross line 65 on the glass. In this case, as on the guide 70, the zero position will be at the middle of the film section to be perforated and the spaces will have associated with them a series of even numbers as shown in Fig. 4, so that when it is desired to mark any given legend on the edge of the film the user ascertains the number of characters and spaces in the legend and brings the line opposite the corresponding number on the film backing into registry with the cross line 65, and thereupon initiates the perforating operation, using the ordinary winding handle of the camera to advance the film to the next line between each perforating operation.

In the embodiment of the invention illustrated herein, it is intended that a total of nineteen pins or punches shall be used, as it is found that the various characters of letters or numerals may be made of this number of pins with sufficient clearness to be readily understood. The relation of the pins to each other is indicated most clearly in Fig. 7 which while not showing the pins themselves shows their corresponding arrangement. In the portion of the index plate shown in Fig. 7, the letters I, J and K will be formed by the manipulation of the index plate. While nineteen pins are, as above stated, found sufficient to produce characters with the necessary degree of accuracy, as many more may be used as desired within the limits of construction of the apparatus, which, of course, should be compact and as light as possible in order not to add any considerable number of parts or unnecessarily increase the weight of the camera to which it is applied.

While the invention has been illustrated in combination with a form of camera now in general use, it is evident that it may be applied to any other form of camera and also that various changes in the details of construction may be made without departing from the principle of the invention. While it is preferred that the characters impressed upon the film should be by complete perforation thereof, it will be understood that some other impression sufficient to make the film transparent or translucent may serve the purpose and where the word "perforation" is used in the appended claims, I intend it to include any such equivalent marking.

I claim:

1. A camera adapted to hold photographic film and having a substantially flat removable back, a plurality of perforating devices associated with and extending through the back, mechanism mounted flat upon the outside of the back for actuating the perforating devices, a film gripping device slidably mounted on the inside of the inner face of the back and a mechanical connection mounted flat upon the inside and transmitting the movement of the actuating mechanism to the film-gripping device to bring successive portions of film into position to be perforated by the perforating devices.

2. A camera adapted to hold photographic film and having a substantially flat removable back, a plurality of perforating devices associated with an extending through the back, a mechanism mounted flat upon the outside of the back for actuating the perforating devices, a flat guideway fixed on the inside of the back, a film-gripping device slidably mounted in said guideway and a flat connecting member slidably mounted on the inside of the camera back and operated by said actuating mechanism to move the film-gripping device to bring successive portions of film into position to be perforated by the perforating devices.

3. A camera adapted to hold photographic film and having a substantially flat removable back formed with curved ends, a plurality of perforating devices associated with and extending through the back, mechanism mounted flat upon the outside of the back for actuating the perforating devices, a substantially flat guideway fixed on the inside of said back, a film-gripping device formed with a curvature substantially equal to that of the ends of the back so that it may fit closely adjacent the ends and slidably mounted in said guideway, and a flat connecting member slidably mounted on the inside of the camera back and operated by said actuating mechanism to move the film-gripping device to bring successive portions of film into position to be perforated by the perforating devices.

4. A camera adapted to hold photographic film, having a supporting member, a plurality of punches mounted upon the supporting member, means for selectively operating said punches, a lever for actuating said operating means, guideways mounted on said supporting member, means mounted in said guideways for gripping the edge of the film to be perforated, a rack bar adapted to be actuated by said lever and a pawl associated with said gripping means for engaging said rack bar whereby said gripping means may be moved by said lever to bring successive portions of film into position to be perforated.

5. A camera adapted to hold photographic film and having a substantially flat removable back, a plurality of perforating devices associated with and extending through the back, a flat dial rotatably mounted on the outside of said back and parallel thereto, said dial being provided with recesses for controlling the selection of said perforating devices, a lever mounted to rotate parallel to the outside of said back for actuating said dial to operate said perforating devices, a substantially flat guideway fixed on the inner face of said back, a film-gripping device slidably mounted in said guideway, a pawl associated therewith, a substantially flat rack bar slidably mounted on the inner face of the camera back and adapted to engage said pawl to move said gripping device and operating connections between said rack bar and said lever.

6. A camera adapted to hold photographic film, having a supporting member, a plurality of perforating devices mounted on the supporting member, guideways mounted on the supporting member and provided with index marks, means for selectively operating said devices, a rack bar mounted to reciprocate on the supporting member and adapted to be actuated by said operating means, a curved base member fitted between the guideways, a curved resilient gripping member attached to the upper edge of the base member and provided with a pawl passing through the base member and adapted to engage the rack bar, and means for raising the gripping member from the base member and for lifting the pawl from the rack bar.

7. A camera adapted to hold photographic film, having a removable back, a plurality of perforating devices mounted upon the back, means including a lever for selectively operating said devices, guideways mounted upon the back of the camera, a base member slidably mounted in the guideways, a gripping member associated with the base member, a rack bar operatively connected to said lever, and means associated with the gripping member for engaging the rack bar whereby the base and gripping members may be actuated from the lever to bring successive portions of film into position to be perforated.

8. A camera adapted to hold photographic film, having a supporting member, a plurality of punches mounted upon the supporting member, means including a lever for selectively operating said punches, guideways mounted on said supporting member, means mounted in said guideways for gripping the edge of the film to be perforated, a rack bar adapted to be actuated by said lever and a pawl associated with said gripping means for engaging said rack bar whereby said gripping means may be moved by said lever to bring successive portions of film into position to be perforated, one of said guideways being provided with a series of index marks designated by alternate numbers and disposed on the guideway at such a distance from the perforating punches that when the film to be perforated is placed at the mark corresponding to the total number of characters and spaces, the inscription will be symmetrically disposed on the film.

9. In a camera adapted to hold a photographic film and provided with a substantially flat removable back, a plurality of perforating devices extending through the back, an operating member on the outside of and parallel to the back and within which said devices are mounted, an actuating member mounted on the outside of and parallel to said back and adapted to engage the ends of predetermined perforating devices to produce selective operation thereof, and a lever mounted on the outside of and movable parallel to said back for moving said operating and actuating members to cause said devices to perforate the film and to restore the said operating and actuating members to normal position after each actuation thereof.

10. In a camera adapted to hold a photographic film and provided with a substantially flat removable back, an elongated operating member mounted on the outside of and parallel to the back, a plurality of perforated devices mounted in said operating member and extending through the back, a circular dial rotatably mounted on the outside of and parallel to said back and provided with a plurality of recesses adapted to engage the ends of predetermined perforating devices to produce selective operation thereof and a lever rotatably mounted on the outside of and movable parallel to said back and provided with an inclined groove adapted to receive one end of the operating member, the same end of the operating member being provided with a recess within which the edge of said dial is mounted, whereby rotation of said lever causes movement of said operating member and dial to cause said perforating devices to perforate the film and to restore the operating member and dial to normal position after each actuation thereof.

11. In a camera adapted to hold a photographic film, a removable back, an operating member, a plurality of perforating devices supported by the operating member, a member for controlling the selection of said perforating devices, a support holding one end of each of said members, a support associated with the operating member for holding one end of the controlling member, and means for actuating said operating member to cause operation of said controlling member to operate the perforating devices.

12. In a camera adapted to hold a photographic film, a removable back, an operating member, a plurality of perforating devices supported by the operating member, a member for controlling the selection of said perforating devices, a support holding one end of each of said members, a support associated with the operating member for holding one end of the controlling member, a lever provided with a spiral groove adapted to coöperate with the support on the operating member for actuating said member and the controlling member to operate said perforating devices.

13. In a camera adapted to hold a roll of photographic film, a removable back, an operating member, a plurality of perforating devices supported by the operating member, a member for controlling the selection of said perforating devices, a support holding one end of each of said members, a support associated with the operating member for holding one end of the controlling member, a lever mounted on the camera back adjacent said support on the operating member and provided with a cylindrical hub portion having a spiral groove, a member associated with the support on the operating member adapted to coöperate with said groove whereby the operating member and the controlling member may be actuated by said lever to cause operation of the perforating means.

14. A camera adapted to hold photographic film having mechanism for selectively perforating sections of the film and means for indicating when the film is in position for successive perforations, said means comprising a series of equidistant marks designated by alternate numbers and so arranged that when the edge of the film is placed at the mark corresponding to the zero point of said series, the point chosen for the center of the inscription on the film will be beneath the perforating mechanism.

15. A camera adapted to hold photographic film having mechanism for selectively perforating sections of the film and means for indicating when the film is in position for successive perforations, said means comprising a series of equidistant marks designated by alternate numbers and so arranged that when the edge of the film is placed at the mark corresponding to the zero point of said series, the center to the film section will be beneath the perforating mechanism.

16. A camera adapted to hold photographic film having mechanism for selectively perforating sections of the film, means for feeding film into position to be perforated, and means for positioning the film in such a relation to the perforating mechanism that the inscription applied to the film will be symmetrically disposed on the film section.

17. A camera adapted to hold photographic film having mechanism mounted on a removable part of the camera for selectively perforating sections of the film, means associated with said removable part of the camera adapted for use when said part is removed to enable the film to be set in such a relation to the perforating mechanism that the inscription may symmetrically disposed on the film section, and means associated with the film and adapted for use when the film is being perforated with the removable back in place, for setting the film in such a relation to the perforating mechanism that the inscription may be symmetrically disposed on the film section.

18. A camera adapted to hold photographic film having mechanism mounted on a removable part of the camera for selectively perforating sections of the film, a plurality of independent means for positioning the film in such a relation to the perforating mechanism that the inscription applied to the film section may be symmetrically disposed thereon, one of said means being associated with the removable part of the camera for use when the said part is removed and film sections are being perforated, and another of said means being associated with the film and adapted for use when film sections are being perforated with the removable part of the camera in place.

19. A camera adapted to hold photographic film having mechanism mounted on a removable part of the camera for selectively perforating sections of the film, means associated with said camera for feeding the film sections into position to be perforated when said removable part is in place on the camera, mechanism movably mounted on the removable part of the camera for feeding the film sections into position to be perforated when said part of the camera is removed, said mechanism being so formed and mounted on the removable part of the camera that it may be disposed thereon in non-interfering relation with the film and other parts of the camera when the removable part is in place on the camera.

20. In a camera adapted to hold photographic film having a removable member within which the film passes as it is drawn through the camera for successive exposures and mechanism mounted on said removable member for perforating successive portions of the film with identification marks of any desired character, the combination of mechanism mounted on the removable member for feeding film into position to be perforated by said perforating mechanism when said member is removed from the camera, said feeding mechanism including a film gripping device slidably mounted on the removable member and adapted to be moved out of the way of the film and other parts of the camera when the removable member is in place on the camera.

In testimony whereof I affix my signature.

HYLA F. MAYNES.